(12) United States Patent
     Kuhl

(10) Patent No.: US 12,607,015 B2
(45) Date of Patent: *Apr. 21, 2026

(54) REPOSITIONABLE CABLE CLIP SYSTEM FOR USE ON STANDING SEAM METAL ROOFS

(71) Applicant: Radiant Solutions Company, Hopkins, MN (US)

(72) Inventor: Steve Kuhl, Minneapolis, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/978,939

(22) Filed: Dec. 12, 2024

(65) Prior Publication Data

US 2025/0129612 A1 Apr. 24, 2025

Related U.S. Application Data

(63) Continuation of application No. 18/058,235, filed on Nov. 22, 2022.

(60) Provisional application No. 63/264,425, filed on Nov. 22, 2021.

(51) Int. Cl.
| | |
|---|---|
| *E04D 13/10* | (2006.01) |
| *F16B 2/06* | (2006.01) |
| *F16B 2/26* | (2006.01) |
| *F16L 3/06* | (2006.01) |
| *F16L 3/12* | (2006.01) |
| *F16M 13/02* | (2006.01) |
| *H02G 3/32* | (2006.01) |

(52) U.S. Cl.
CPC ............ *E04D 13/103* (2013.01); *F16B 2/065* (2013.01); *F16B 2/26* (2013.01); *F16L 3/06* (2013.01); *F16L 3/12* (2013.01); *F16M 13/02* (2013.01); *H02G 3/32* (2013.01)

(58) Field of Classification Search
CPC .......... E04D 13/103; F16B 2/065; F16B 2/26; F16L 3/06; F16L 3/12; F16M 13/02; H02G 3/32
USPC ................................................ 219/213, 549
See application file for complete search history.

(56) References Cited

U.S. PATENT DOCUMENTS

| | | | | | |
|---|---|---|---|---|---|
| 4,043,527 | A | * | 8/1977 | Franzmeier | ......... E04D 13/0762 |
| | | | | | 248/65 |
| 6,269,596 | B1 | * | 8/2001 | Ohtsuka | .................. H02S 20/23 |
| | | | | | 126/621 |

* cited by examiner

*Primary Examiner* — Phuong T Nguyen

(74) *Attorney, Agent, or Firm* — McKinley IP; David J McKinley

(57) ABSTRACT

A repositionable roof clip assembly may include a mounting block including: a first wall, a second wall, a top wall joining the first wall and second wall and creating a gap therebetween; and at least one cable clamp including: a lower guide, an upper guide; and a bendable member joining the lower and upper guides and can be bent over a heating cable such that the heating cable is trapped between the upper guide and the lower guide.

5 Claims, 3 Drawing Sheets

REPOSITIONABLE CABLE CLIP SYSTEM FOR USE ON STANDING SEAM METAL ROOFS

PRIORITY CLAIM TO RELATED APPLICATIONS

This application is a continuation of, and claims priority to, related previously-filed U.S. Non-provisional patent application Ser. No. 18/058,235 to Kuhl, filed Nov. 22, 2022, which claims priority to U.S. Provisional Patent Application Ser. No. 63/264,425 to Kuhl, filed Nov. 22, 2021, entitled ROOF CABLE CLIPS. The contents of these previously-filed applications are incorporated by reference herein in their entireties.

BACKGROUND OF THE INVENTION

Heated cables are commonly used to prevent ice buildup on roofs in cold climates. The positioning of these cables is critical for the cables to function properly. Roof clips are typically used to connect the cable to the roof top and vary in design according to the type of roof on which they will be deployed.

Standing seam metal roofs have parallel raised seams that are evenly spaced and run from the roof peak down to the eaves to create channels in between the seams. This type of roof has a smooth surface and may result in large pieces of snow breaking loose and sliding down the channels and off of the roof. It is thus important that a heated cable be routed such that shifting snow does not pull the cable out of position. It is of further importance that the clips route the cable in such a way that conforms to all industry standards.

In some instances, it is desirable to be able to adjust or reposition the clips. It would be beneficial to be able to do so with drilling holes in the roof.

OBJECTS AND SUMMARY OF THE INVENTION

The various embodiments of the invention described herein address the aforementioned needs by providing a cable clip system that easily attaches to a metal roof seam and routes a heated cable such that the cable is oriented straight down the slope. The orientation of the cable provides an uninterrupted path for water and snow to slide down the roof without putting undue forces on the cable. The clip also prevents the cable from bending sharper than the minimum radius allowed by industry standards. Additionally, the clip allows the cable to be attached quickly and securely, to maximimize installation efficiency.

In some aspects, the techniques described herein relate to a roof clip assembly for use in securing a heating cable to a metal roof seam including: a mounting block including: a first wall; a second wall; a top wall joining the first wall and second wall and creating a gap therebetween; and at least one cable clamp including: a lower guide; an upper guide; and a bendable member joining the lower and upper guides and can be bent over a heating cable such that the heating cable is trapped between the upper guide and the lower guide.

In some aspects, the techniques described herein relate to a system for preventing a buildup of ice on a metal roof with a plurality of seams forming channels between the seams, the system including: a plurality of roof clip assemblies adjustably fastenable to seams on a metal roof; a heating cable routable through the plurality of roof clip assemblies;

and a routing pattern for the heating cable in which: the heating cable passes through a first cable clamp of a first roof clip assembly of the plurality of roof clip assemblies, the first roof clip assembly positioned on a first seam of the plurality of seams at a lower location; the heating cable continues upward along one side of the first seam through a routing clamp of a second roof clip assembly of the plurality of roof clip assemblies, the second roof clip assembly positioned on the first seam at an upper location, wherein the routing clamp of the second roof clip assembly spans across the first seam; the heating cable continues downward along a second side of the first seam through a second routing clamp of the first roof clip assembly; the heating cable is routed below an upper surface of the metal roof to a second seam of the plurality of seams; and wherein the routing pattern is repeated for a desired number of seams of the plurality of seams; wherein the channels between the seams remain clear of horizontally-oriented lengths of heating cables.

In some aspects, the techniques described herein relate to a method of preventing a buildup of ice on a metal roof with a plurality of parallel seams forming channels between the seams, the method including: adjustably fastening a plurality of roof clip assemblies to upper and lower locations on each of a plurality of seams using set screws to form a friction fit; and routing a heating cable through the plurality of roof clip assemblies such that the channels formed between adjacent seams of the plurality of seams remain free of horizontal lengths of the heating cable.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
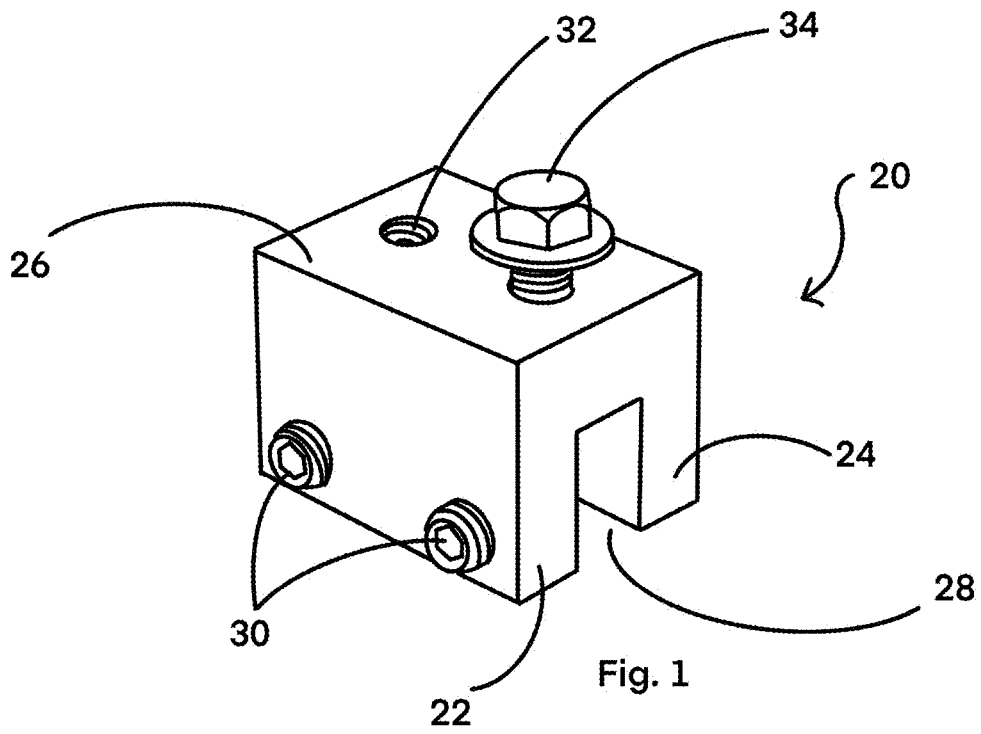
FIG. 1 is a perspective view of an embodiment of a mounting block of the invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Figure 2:
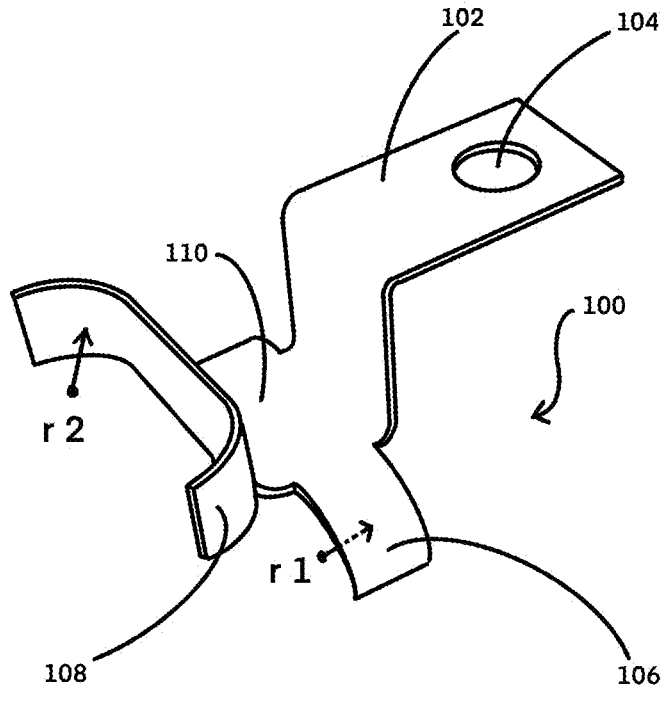
FIG. 2 is a perspective view of an embodiment of a roof clip of the invention.

The roof clip assembly 10 generally includes a mounting block 20 and a cable clamp 100 that is attachable to the mounting block 20. An embodiment of the mounting block 20 is shown in FIG. 2. The mounting block 20 includes a first wall 22 and a second wall 24 joined by a top wall 26 creating a gap 28 between the first wall 22 and the second wall 24 in which a metal roof seam may be received.

The mounting block 20 includes a plurality of set screws 30 that pass through the first wall 22 and the second wall 24 and may be tightened for securing the mounting block 20 to the seam with a friction fit. The top wall 26 includes block holes 32 for receiving fasteners 34, such as screws or bolts, usable to connect the routing clamp to the mounting block 20.

Each cable clamp 100 includes an attachment plate 102 with at least one plate hole 104 that aligns with at least one of the block holes 32. The plate hole 104 may be elongated to allow for adjustment of the position of the cable clamp 100. The cable clamp 100 further includes a lower guide 106 and an upper guide 108. The lower guide 106 and upper guide 108 are joined with a bendable member 110. The bendable member 110 is constructed to be bendable without the use of tools, yet strong enough to retain the bent configuration while subjected to shifting snow and ice.

In at least one embodiment, the cable clamp 100 is constructed from a single sheet of a suitable rigid but bendable material, such as steel or aluminum, and formed into a preinstalled shape, such as that shown in FIGS. 1 and 2. In these embodiments, the desired bendability of bendable member 110 may be attained by selecting a width that is narrow enough to afford bendability while maintaining sufficient strength.

The lower guide 106 and upper guide 108 each have ends curved to predetermined radii r1 and r2, respectively. Radii r1 and r2 may be equal. The curves facilitate entry and exit of the cable into and out of the clamp, thereby gently trapping the cable 502 in the clamp without contacting sharp edges that could damage the cable. Additionally, heated cable routing must meet industry standards, which includes a minimum radius of any bend in the cable. By selecting a predetermined radius r1, r2 that is equal to or greater than the industry standard, the installers are assured of meeting the standards without the need to measure the radius of the cable curves.

Figure 3:
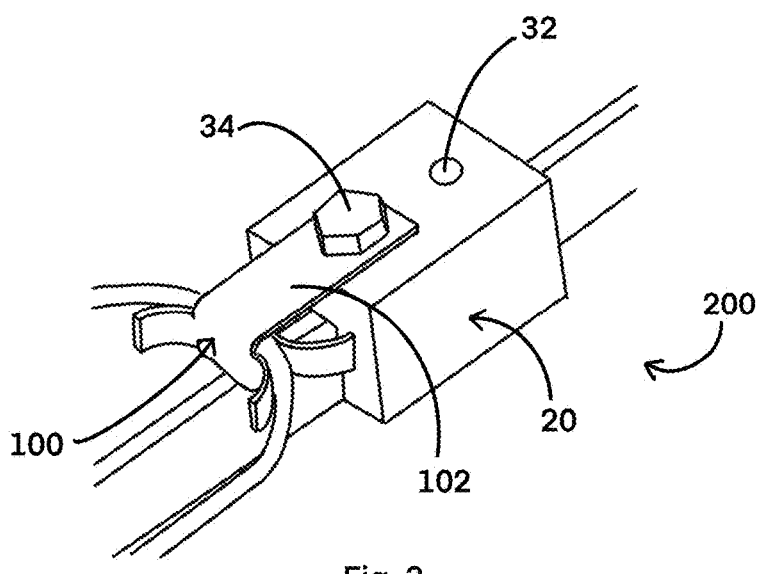
FIG. 3 is a perspective view of a roof clip assembly of the invention.

FIG. 3 shows an embodiment of a roof clip assembly 10 arranged to form a single clamp clip assembly 200, the function of which will be discussed below. The single clamp clip assembly 200 includes a mounting block 20 with a single cable clamp 100 fastened to the top wall 26 of the mounting block 20. The single cable clamp 100 is fastened to the top wall 26 by inserting a fastener 34 through the plate hole 104 of a cable clamp 100 and into the block hole 32 of the mounting block 20. The cable clamp 100 is arranged such that it extends downward over the roof seam when attached thereto.

Figure 4:
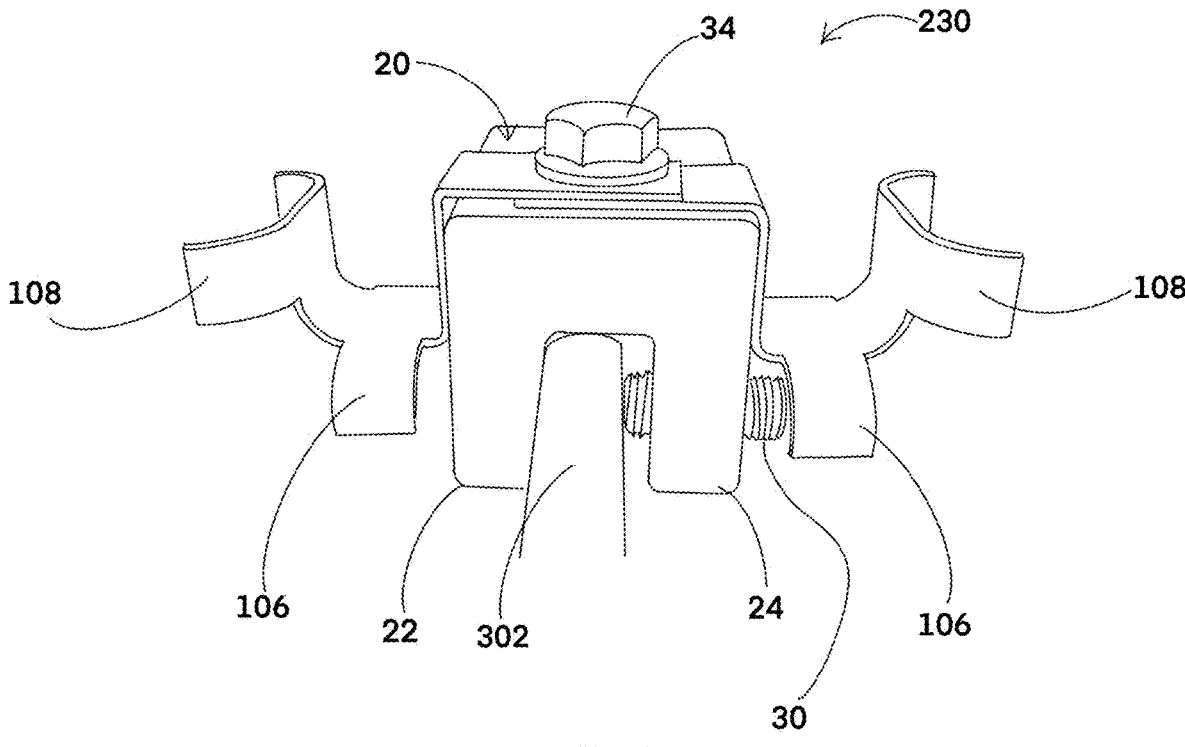
FIG. 4 is a perspective view of a roof clip assembly of the invention.

FIG. 4 shows an embodiment of a roof clip assembly 10 arranged to form a double clamp clip assembly 230, the function of which will be discussed below. The double clamp clip assembly 230 includes a mounting block 20 with a two cable clamps 100 fastened to the top wall 26 of the mounting block 20. The cable clamps 100 are fastened to the top wall 26 by inserting a fastener 34 through the plate holes 104 of both cable clamps 100 and into the block hole 32 of the mounting block 20. The cable clamps 100 are arranged as shown, each projecting away from each other and over the first wall 22 and second wall 24 of the mounting block 20.

Figure 5:
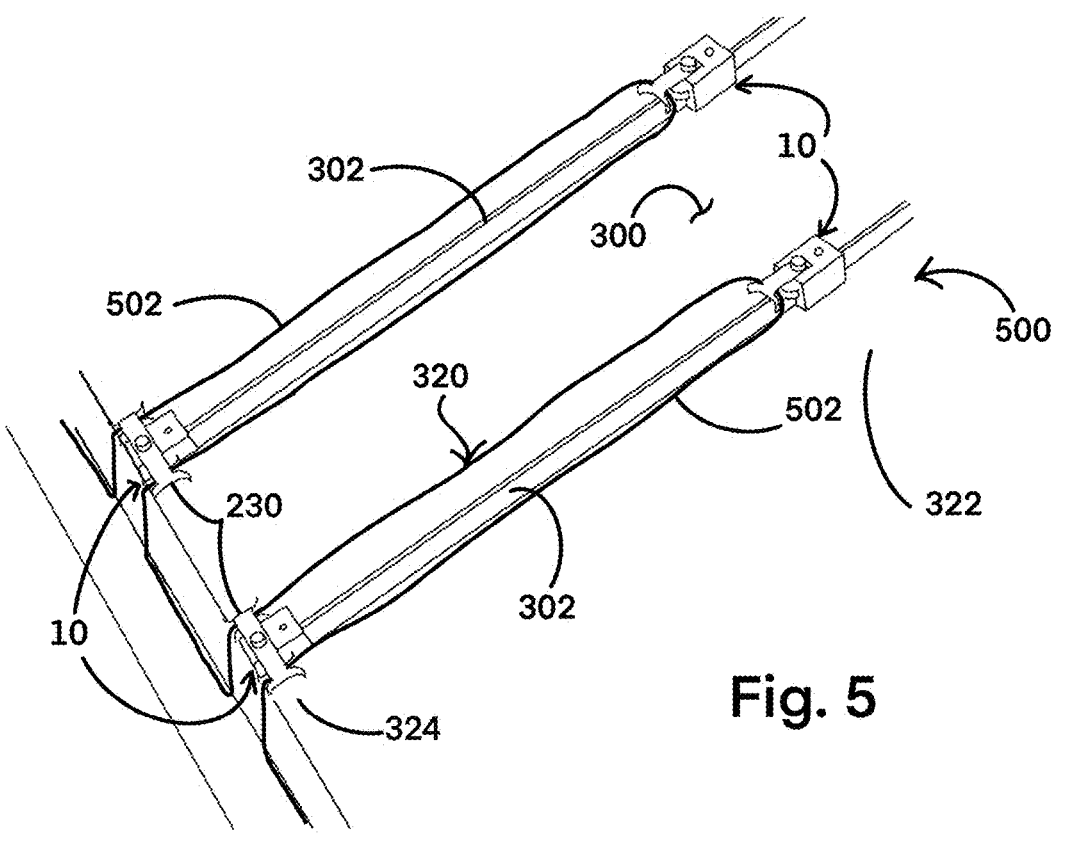
FIG. 5 is a perspective view of an embodiment of a heating cable routing pattern of the invention.

FIG. 5 is an example of a heated cable system 500 that includes a heated cable 502 and the roof clip assemblies 10 and is installed on a roof 300 to form a routing pattern 320. The roof 300 has parallel vertical seams 302 that run directly down the slope of the roof 300. The routing pattern 320 is formed by placing double clamp clip assemblies 230 at a lower location 324 and single clamp clip assemblies 200 at an upper location 322 on each seam 302 above an eave 304 of the roof 300. The upper location 322 should be selected such that it is directly above an outside wall of the structure. The lower location 324 should be at a bottom of the seam 302. The routing pattern 320 is then completed by installing a cable 502, preferably according to the method 400 described below, through the cable clamps 100 of the roof clip assemblies 10.

As seen in FIG. 5, doing so results in the cable extending through a cable clamp 100 of a double clamp clip assembly 230 at a lower location 324, up along one side 312 of a seam 302, through the cable clamps 100 of a single clamp clip assembly 200 at the upper location 322, which routes the cable 502 over the seam 302 and back down a second side 314 of the seam 302 where the cable 502 runs through a second of the two cable clamps 100 of the double clamp clip assembly 230 at the lower location 324. The heating cable 502 is then routed below the roof channel 318 formed between the seams 302 to the next adjacent seam 302. Ensuring that the cable 502 is routed below the roof channel 318 ensures that the cable 502 will not be impacted by snow or ice sliding off of the roof 111. Optionally, as shown, on roofs that have gutters, the cable 502 may be routed through the gutter to maintain water flow through the gutters.

Figure 6:
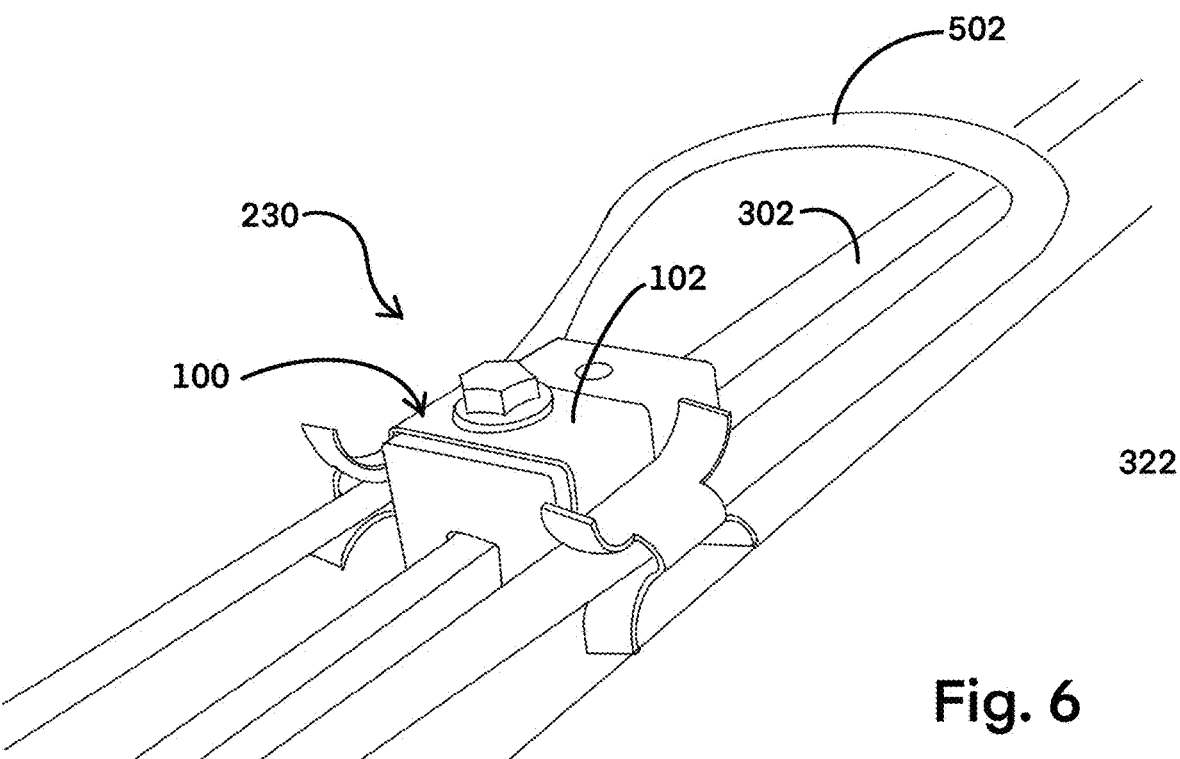
FIG. 6 is a perspective view of a roof clip assembly of the invention.

FIG. 6 shows how a cable 502 may be routed over a seam when a double clamp clip assembly 230 is used at the upper location 322.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A roof clip assembly for use in securing a heating cable to a metal roof seam comprising: a mounting block including: a first wall; a second wall; and a top wall joining the first wall and the second wall and creating a gap therebetween; and at least one cable clamp, attachable to the mounting block, including: a lower guide; an upper guide; and a bendable member joining the lower guide and the upper guide and bendable over the heating cable such that when bent over the heating cable, the heating cable is trapped between the upper guide and the lower guide.

2. The roof clip assembly of claim 1 wherein the at least one cable clamp includes a hole passing through an attachment plate of the at least one cable clamp and alignable with a corresponding hole in a wall of the mounting block and usable to attach the at least one cable clamp to the wall of the mounting block with a fastener.

3. The roof clip assembly of claim 2 wherein the at least one cable clamp comprises a first cable clamp proximate the first wall and a second cable clamp proximate the second wall.

4. The roof clip assembly of claim 3 wherein the attachment plate joins the first cable clamp and the second cable clamp.

5. The roof clip assembly of claim 1 wherein at least one of the upper guide and the lower guide is curved.

* * * * *